(12) United States Patent
Velummylum et al.

(10) Patent No.: US 8,990,265 B1
(45) Date of Patent: *Mar. 24, 2015

(54) CONTEXT-AWARE DURABILITY OF FILE VARIANTS

(75) Inventors: Piragash Velummylum, Seattle, WA (US); Johanna S. Olson, Bellevue, WA (US); Korwin J. Smith, Seattle, WA (US); James H. Wood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,312

(22) Filed: Mar. 14, 2011

(51) Int. Cl.
*G06F 7/00* (2006.01)
*G06F 17/00* (2006.01)
*G06F 17/30* (2006.01)

(52) U.S. Cl.
USPC ............ 707/803; 707/665; 707/806; 707/809

(58) Field of Classification Search
CPC ................................................ G06F 17/30867
USPC .................. 707/101, 736, 770; 709/217, 219; 711/216; 705/26.1
See application file for complete search history.

(56) References Cited

U.S. PATENT DOCUMENTS

| 7,003,481 B2 * | 2/2006 | Banka et al. ................. 705/26.1 |
| 2006/0069749 A1 * | 3/2006 | Herz et al. .................... 709/219 |
| 2006/0206582 A1 * | 9/2006 | Finn .............................. 709/217 |
| 2009/0037448 A1 * | 2/2009 | Thomas ........................ 707/101 |
| 2011/0191361 A1 * | 8/2011 | Gupta et al. .................. 707/763 |
| 2011/0283085 A1 * | 11/2011 | Dilger et al. ................. 711/216 |
| 2011/0314058 A1 * | 12/2011 | Motwani ...................... 707/770 |

* cited by examiner

*Primary Examiner* — Susan Chen
(74) *Attorney, Agent, or Firm* — Thomas | Horstemeyer, LLP

(57) ABSTRACT

Disclosed are various embodiments for context-aware durability of variants of files. A first data store is associated with a first level of data durability, and a second data store is associated with a second level of data durability that is lower than the first level of data durability. A data object is stored in the second data store when the data object is a derivative of another data object stored in the first data store. A data object is stored in the first data store when the data object is not a derivative of another data object stored in the first data store.

21 Claims, 6 Drawing Sheets

CONTEXT-AWARE DURABILITY OF FILE VARIANTS

CROSS REFERENCE TO RELATED APPLICATIONS

The following application is related to co-pending U.S. patent application entitled "VARIANTS OF FILES IN A FILE SYSTEM" filed on even date Ser. No. 13,047,343, which is incorporated herein by reference in its entirety.

BACKGROUND

Network connections for different computing devices may have different capabilities. For example, a network connection for a home laptop or workstation may be a reliable, high speed connection. By contrast, a network connection for a smartphone may be a relatively low speed connection with a relatively high probability of packet loss. In addition, different computing devices may have different physical characteristics. For example, a home workstation may have a large display, a laptop may have a relatively smaller display, and a smartphone may have a handheld display.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing a file system that includes variants of files. With the ubiquitous availability of network connectivity for computing devices, users are increasingly seeking ubiquitous availability for their data files. For example, users may want to listen to an audio file from their smartphone, from their office workstation, from their laptop at home, and/or from other computing devices. However, users may be inconvenienced by having to carry around portable storage devices and connect them to their computing devices. In addition, it may be difficult to access a file stored on a portable storage device from multiple computing devices.

Various embodiments of the present disclosure relate to remote storage of data files and variants of files according to a utility computing model. A file system may be employed to provide access to files stored in a cloud computing resource comprising a networked plurality of computing devices. In some embodiments, the file system may correspond to a virtual file system where the actual data objects of the files are stored in a separate data storage system.

Variants of files may correspond to version of files that are related to other files or derived or generated from other files. Such variants may be customized for particular client computing devices of a customer. In various embodiments, variants may exist transparently to the customer such that a customer may be sent a file variant instead of the original, for example, when the customer is using a particular type of client computing device to request the file. In some embodiments, context-aware durability of variants may be employed such that data that correspond to the variants are stored in data stores that offer reduced durability of data. In the following discussion, a general description of the system and its components is provided, followed by a discussion of the operation of the same.

Figure 1:
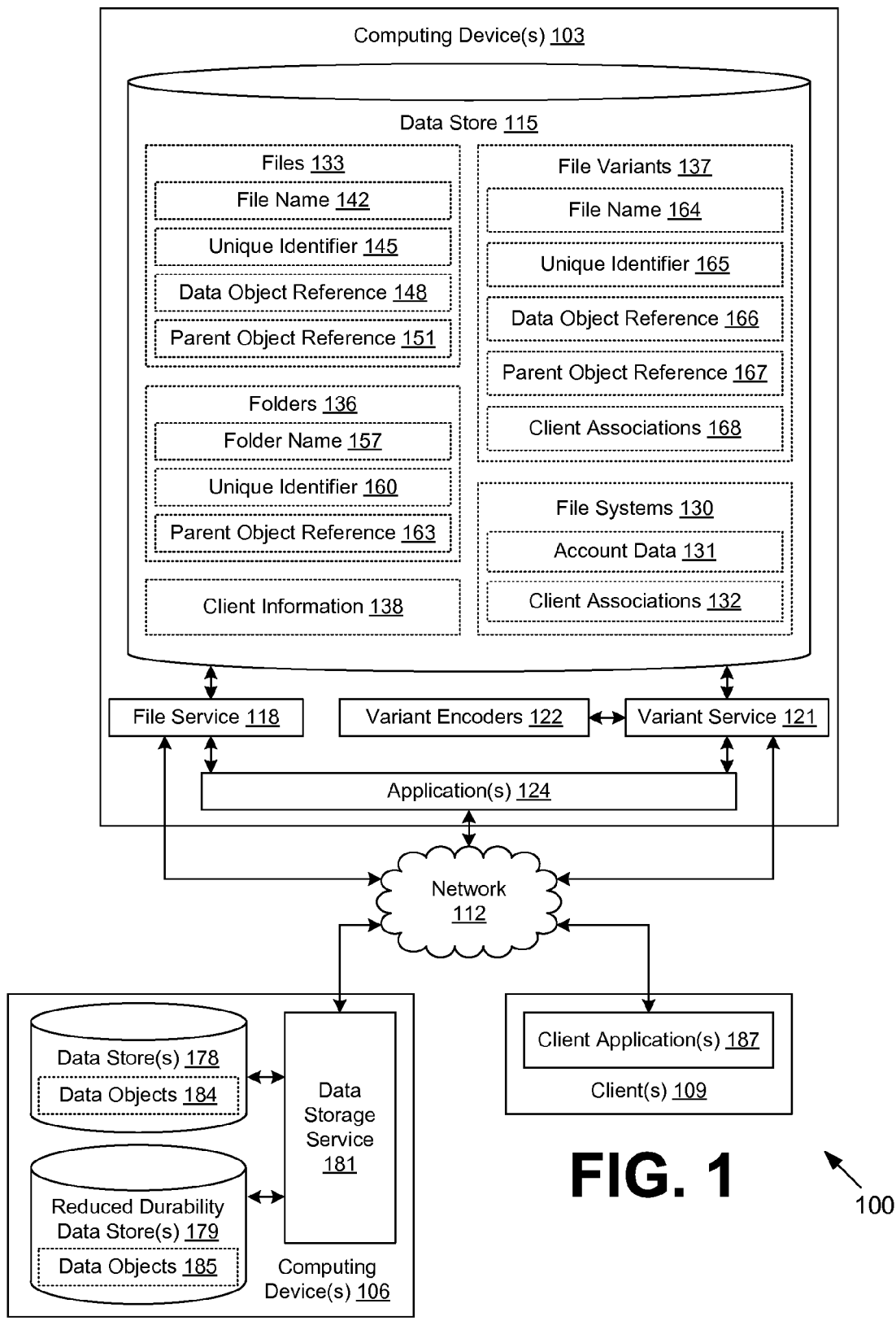
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a file service 118, a variant service 121, one or more variant encoders 122, one or more applications 124, and other applications, services, processes, systems, engines, or functionality not discussed in detail herein. The file service 118 is executed to maintain a file hierarchy of files and folders in based file systems for users. To this end, the file service 118 may support various file-related operations such as, for example, creating files, deleting files, modifying files, setting permissions for files, downloading files, and/or other operations.

The variant service 121 is executed to create and maintain variants of files in the file systems. To this end, the variant service 121 may be configured to detect situations in which file variants are to be generated, for example, for particular types of clients, for particular applications 124, and/or for other contexts. The variant service 121 may be executed in conjunction with one or more variant encoders 122 to generate the variants. The variant encoders 122 may correspond, for example, to audio codecs, video codecs, image resizing applications, data compression applications, data transformation applications, data import applications, and/or other encoders of data. The variant service 121 may also be configured to delete unnecessary variants periodically.

The applications 124 correspond to hosted applications that may access the data stored in the file systems. Various applications 124 may, for example, have a web-based interface and may serve up network pages, such as web pages or other forms of network content, to facilitate user interaction. Other applications 124 may be internal applications and may not have a web-based interface. Non-limiting examples of applications 124 may include a photo organizing tool, a music file organizer and playback tool, a word processor, a spreadsheet, an email application, and so on.

The data stored in the data store 115 includes, for example, file systems 130, files 133, folders 136, file variants 137, client information 138, and potentially other data. The file systems 130 correspond to logical file hierarchies that are maintained within the computing device 103 on behalf of one or more users. In various embodiments, the logical file hierarchies embodied in the file systems 130 are abstractions that do not directly correspond to any particular physical storage arrangements such as disk drives, portable storage media, etc. Each account-level user may have its own file system 130, or the file systems 130 may be shared by multiple account-level users.

Each file system 130 may be associated with account data 131, one or more client associations 132, and/or other file system metadata. The account data 131 includes various data regarding authorized users of the computing device 103. Such account data 131 may include, for example, usernames, passwords, security credentials, file management permissions, storage quotas and limitations, authorized applications, billing information, and/or other data. The client associations 132 describe various clients that are associated with the file system 130. The clients may correspond, for example, to client computing devices such as clients 109 or applications/services such as applications 124. As a non-limiting example, a user may use a tablet computing device, a desktop workstation, and a smartphone to access the file system 130. The client associations 132 may also describe various capabilities of clients 109, such as types of browser applications, plug-ins present, email applications, and so on. Accordingly, the client associations 132 may permit the variant service 121 and/or other applications to determine types of clients that are associated with each file system 130. The client associations 132 may be detected automatically and/or may be manually configured.

Each file system 130 may include one or more files 133 and one or more folders 136. A file 133 may include a file name 142, a unique identifier 145, a data object reference 148, a parent object reference 151, one or more permissions, a file creation date, a file modification date, and/or other data. The file name 142 may correspond to a human-readable character string that identifies the contents of the file 133. In some embodiments, the file name 142 may be limited in character length and may be limited in terms of allowed characters. In some cases, such limitations may be enforced for compatibility reasons. In addition, the file name 142 may be restricted to be unique for a folder 136 and/or for a file system 130 in various embodiments.

The unique identifier 145 corresponds to a number, character string, or other identifier that uniquely identifies the file 133 across the file system 130 and/or all of the file systems 130. In one embodiment, a unique identifier 145 of a file 133 coupled with an identifier of a file system 130 may correspond to an identifier that is unique across all of the file systems 130. In another embodiment, the unique identifier 145 of a file 133 may itself be unique across all of the file systems 130.

The data object reference 148 corresponds to a reference that may identify a data object associated with the file 133 that is stored in a data store such as the data store 115 or another data store. In one embodiment, the data object reference 148 may include a uniform resource identifier (URI). In another embodiment, the data object reference 148 may include a key value for obtaining the data object. The data store from which to obtain the data object may be determined implicitly or explicitly, for example, from a definition in the data object reference 148.

The parent object reference 151 corresponds to a reference that may identify a folder 136 or file 133 that is considered to be the parent of the file 133. In this way, folders 136 are associated with files 133. In some situations, the parent object reference 151 may include a special identifier (e.g., NULL, 0, etc.) that identifies the root folder 136 of the file system 130.

Each folder 136 may include, for example, a folder name 157, a unique identifier 160, a parent object reference 163, permissions, and/or other data. It is noted that, in some embodiments, a folder 136 may be implemented using the same data structure as a file 133. In other embodiments, a folder 136 may be implemented using a data structure that is different from the file 133.

The unique identifier 160 corresponds to a number, character string, or other identifier that uniquely identifies the folder 136 across the file system 130 and/or all of the file systems 130. In one embodiment, a unique identifier 160 of a folder 136 coupled with an identifier of a file system 130 may correspond to an identifier that is unique across all of the file systems 130. In another embodiment, the unique identifier 160 of a folder 136 may itself be unique across all of the file systems 130. In some embodiments, the unique identifier 160 may also be unique with respect to the unique identifiers 145 of the files 133.

The parent object reference 163 corresponds to a reference that may identify a folder 136 or file 133 that is considered to be the parent of the folder 136. In this way, folders 136 are associated with other folders 136. In some situations, the parent object reference 163 may include a special identifier (e.g., NULL, 0, etc.) that identifies the root folder 136 of the file system 130.

The file variants 137 are variants of files 133 or other file variants 137. The file variants 137 may be data-reduced versions of the files 133 or other file variants 137. As a non-limiting example, where the file 133 corresponds to an image, a file variant 137 associated with the file 133 may correspond to a reduced-size version of the image, such as a thumbnail or other image. As another non-limiting example, where the file 133 corresponds to an audio file 133, a file variant 137 associated with the file 133 may correspond to a downsampled version of the audio file 133, with a lower sample rate, lower bitrate, more aggressive compression, and/or other changed characteristics. In some cases, the file variants 137 may be customized or optimized for a particular type of client computing device, such as, for example, a mobile computing device like a smartphone. The file variants 137 may also be customized for delivery for particular types or categories of client 109 configurations.

Each file variant 137 may include, for example, a file name 164, a unique identifier 165, a data object reference 166, a parent object reference 167, a description of one or more client associations 168, and/or other data. The file name 164 may correspond to a human-readable character string that identifies the contents of the file variant 137. In some embodiments, the file name 164 may be limited in character length and may be limited in terms of allowed characters. In some cases, such limitations may be enforced for compatibility reasons. In addition, the file name 164 may be restricted to be unique for a folder 136 and/or for a file system 130 in various embodiments. In one embodiment, the file name 164 corresponds to the file name 142 of the corresponding file 133 associated with the file variant 137, with or without a distinguishing identifier. The file name 164 may be generated automatically by the variant service 121. The file name 164 may be hidden or absent in embodiments where the file variants 137 are ordinarily hidden from users.

The unique identifier 165 corresponds to a number, character string, or other identifier that uniquely identifies the file variant 137 across all of the file variants 137 of a particular file 133 or across a file system 130 and/or all of the file systems 130. In one embodiment, a unique identifier 165 of a file variant 137 coupled with an identifier of a file system 130 may correspond to an identifier that is unique across all of the file systems 130. In one embodiment, a unique identifier 165 of a file variant 137 coupled with a unique identifier 145 of a corresponding file 133 may correspond to an identifier that is unique across all of the file systems 130. In another embodiment, the unique identifier 165 of a file variant 137 may itself be unique across all of the file systems 130.

The data object reference 166 corresponds to a reference that may identify a data object associated with the file variant 137 that is stored in a data store such as the data store 115 or another data store. In one embodiment, the data object reference 166 may include a uniform resource identifier (URI). In another embodiment, the data object reference 166 may include a key value for obtaining the data object. The data store from which to obtain the data object may be determined implicitly or explicitly, for example, from a definition in the data object reference 166. In some embodiments, the data objects corresponding to file variants 137 may be stored in a different data store from the data objects corresponding to the files 133. As a non-limiting example, the data objects corresponding to file variants 137 may be stored in a data store that offers reduced data durability.

The parent object reference 167 corresponds to a reference that may identify a file 133 or a file variant 137 that is considered to be the parent of the file variant 137. In this way, a file variant 137 is tied to a file 133 or another file variant 137 to which the file variant 137 is related. The client associations 168 may refer to types of configurations of clients 109 with which the file variant 137 is associated. As a non-limiting example, a file variant 137 might be customized for streaming to mobile devices, such as smartphones. Therefore, the client associations 168 may identify one or more smartphones associated with the user for which the file variant 137 is customized. In some cases, a file variant 137, such as a thumbnail image, may be applicable to all clients 109 and configurations.

The client information 138 includes information relating to capabilities of clients, such as, for example, clients 109, applications 124, and/or other types of clients. The client information 138 may describe the capabilities of clients, such as whether they are able to decode an audio file encoded with a certain codec, the display screen size, network 112 bandwidth limitations, and so on. In one embodiment, the client information 138 may include associations of types of clients with types of file variants 137.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations.

For purposes of convenience, the computing device 106 is referred to herein in the singular. Even though the computing device 106 is referred to in the singular, it is understood that a plurality of computing devices 106 may be employed in the various arrangements as described above. Further, though the computing device 106 is described separately from the computing device 103, it is understood that the applications and data described in connection with the computing device 106 may be provided in the computing device 103 in some embodiments. In some cases, one or more of the computing devices 106 may be operated by an entity that is different from the entity that operates the computing devices 103.

Various applications and/or other functionality may be executed in the computing device 106 according to various embodiments. Also, various data is stored in a data store 178 and a reduced durability data store 179 that are accessible to the computing device 106. The data store 178 and the reduced durability data store 179 may each be representative of a plurality of data stores 178 and/or reduced durability data stores 179 as can be appreciated. In one embodiment, the data store 178 and/or reduced durability data store 179 may correspond to cloud storage resources where data storage is provided according to a utility computing model. In one embodiment, the data store 178 and/or reduced durability data store 179 may provide eventually consistent storage.

The reduced durability data store 179 is associated with a lower level of data durability than the data store 178. That is to say, there may be a higher probability that data stored in the reduced durability data store 179 may be lost, unavailable, or otherwise inaccessible in comparison to the data stored in the data store 178. The reduced durability data store 179 may, for example, store fewer redundant copies of data or have a lower level of hardware redundancy in comparison to the data store 178. In one embodiment, the data store 178 may include data that can be processed to regenerate other data stored in the data store 178, while the reduced durability data store 179 may exclude data that can be processed to regenerate other data stored in the reduced durability data store 179. The reduced durability data store 179 may be less geographically distributed, have a less reliable power supply, have fewer redundant connections to the network 112, and/or other resource constraints in comparison to the data store 178.

As a non-limiting example, the data store 178 may be associated with a 99.9999% probability that no data item will be lost for a user within a year, while the reduced durability data store 179 may be associated with a 99.99% probability that no data item will be lost for a user within a year. Such percentages are given merely as examples to illustrate the reduced level of durability associated with the reduced durability data store 179. It is noted that the reduced durability data store 179 may be absent in some embodiments, and the data may instead be stored in the data store 178. The data stored in the data store 178 and the reduced durability data store 179, for example, are associated with the operation of the various applications and/or functional entities described below.

The components executed on the computing device 106, for example, include a data storage service 181 and other applications, services, processes, systems, engines, or functionality not discussed in detail herein. The data storage service 181 is executed to provide access to store and retrieve data from the data stores 178. The data storage service 181 may store and retrieve data based upon a unique identifier such as a key, which may be a character string, number, or other identifier. The data storage service 181 may function to abstract the underlying storage layer so that users of the data storage service 181 have no knowledge as to how their data is actually being stored. For example, users may not know on what disk drives, in what computing device 106, in what data center, etc. that their data is being stored. In various embodiments, a user may be able to specify performance characteristics or types of hardware to be used in storing the data. For example, a user may be able to request that a data object be stored in the reduced durability data store 179 instead of the data store 178.

In embodiments that include the reduced durability data store 179, the data storage service 181 may be configured to direct storage of data to either the data store 178 or the reduced durability data store 179 based on whether the data is a file variant 137 or otherwise derived from other data that is stored in the data store 178. Thus, if data is lost or otherwise unavailable from the reduced durability data store 179, the data may be regenerated from data stored in the data store 178. In some embodiments, the file service 118, the variant service 121, and/or another application may direct the storage of data to either the data store 178 or the reduced durability data store 179.

The data stored in the data store 178 includes, for example, data objects 184 and potentially other data. The data objects 184 correspond to the data stored for the files 133. Such data may be any type of data object, such as, for example, text data, binary data, multimedia data, and so on. In some embodiments, the data objects 184 may also correspond to the data stored for the file variants 137. The data stored in the reduced durability data store 179 includes, for example, data objects 185 and potentially other data. The data objects 185 correspond to the data stored for the file variants 137. Such data may be any type of data object, such as, for example, text data, binary data, multimedia data, and so on.

It is noted that in some configurations, the data objects 184 and 185 may merely be references to another data object 184 and 185. For example, multiple users may have copies of a music file in their file system 130. Because the copies are identical, the data objects 184 and 185 may merely be addresses or pointers to the shared data. Such associations may be updated with a copy-on-write system when the shared data is modified. In some cases, the shared data may be stored externally in a content delivery network.

The client 109 is representative of a plurality of client devices that may be coupled to the network 112. The client 109 may comprise, for example, a processor-based system such as a computer system. Such a computer system may be embodied in the form of a desktop computer, a laptop computer, mobile devices, personal digital assistants, cellular telephones, smartphones, set-top boxes, music players, web pads, tablet computer systems, game consoles, electronic book readers, or other devices with like capability. The client 109 may include, for example, one or more display devices such as cathode ray tubes (CRTs), liquid crystal display (LCD) screens, gas plasma-based flat panel displays, LCD projectors, or other types of display devices, etc.

The client 109 may be configured to execute various applications such as a client application 187 and/or other applications. The client application 187 is executed to store, retrieve, process, and otherwise use files 133 and folders 136 in one or more file systems 130 in the computing device 103. In one embodiment, the client application 187 corresponds to a browser application that renders network pages provided by the computing device 103 that facilitate interaction with the file service 118, the variant service 121, and/or the applications 124. In one embodiment, the client application 187 is integrated with an operating system of the client 109 to provide access to a file system 130 similarly to any mounted file system of the client 109. The client 109 may be configured to execute applications beyond client application 187 such as, for example, browser applications, email applications, instant message applications, and/or other applications.

Next, a general description of the operation of the various components of the networked environment 100 is provided. To begin, a user may establish an account through the client application 187 or another application 124 to create or access one or more file systems 130. Where the user is described as performing an action, it is understood that the user may be interacting with at least the client application 187 to perform the action.

The user may specify various parameters, such as, for example, a maximum storage requirement, performance requirements, a rate plan, access permissions, security credentials, and so on. The user may provide billing information and/or existing billing information may be correlated with the user. Accordingly, the account data 131 is populated and a file system 130 may be created. In some embodiments, the user may also specify various types of clients 109 which will be accessing the file system 130. This information may be stored, for example, in the client associations 132.

The user may transfer files to the file system 130 by way of the applications 124 or the client applications 187. Such a transfer may involve the user uploading a file from the client 109 to the computing device 103 or the computing device 106. In other cases, a user may purchase a file (e.g., a music file) from an online retailer associated with the computing device 103, and the file may be automatically saved to the file system 130 by way of an application 124.

When a file is transferred to the file system 130, a file 133 is created in the file system 130 by the file service 118. The file name 142 may correspond to the original file name associated with the source file, or the file name 142 may be explicitly specified by the user or an application 124. The unique identifier 145 is generated for the file 133. A data object 184 corresponding to the data associated with the source file is stored in the data store 178 by the file service 118 interacting with the data storage service 181. A data object reference 148 corresponding to the stored data object 184 is then recorded for the file 133. A parent object reference 151 may optionally be specified for the file 133. If no parent object reference 151 is specified, the file 133 may be considered to be in the root folder 136 for the file system 130.

Folders 136 may also be created or imported by users and/or applications 124. The folder name 157 may correspond to the original name associated with a source folder, or the folder name 157 may be explicitly specified by the user or the application 124. The unique identifier 160 is generated for the folder 136. A parent object reference 163 may optionally be specified for the folder 136. If no parent object reference 163 is specified, the folder 136 may be considered to be in the root folder 136 for the file system 130.

It is noted that the various data associated with the files 133, the folders 136, or the file systems 130 need not be recorded in inodes, vnodes, file allocation tables, or any other data structure associated with physical file systems. In various embodiments, the data associated with the files 133, the folders 136, and the file systems 130 may be maintained as data within a relational database management system (RDBMS) or similar database management systems.

The file service 118 may support various operations related to files 133 and folders 136 such as, for example, renaming, copying, moving, deleting, recycling, uploading, downloading, and so on. When a file 133 or folder 136 is renamed, the file name 142 or folder name 157 is updated, but no change occurs to the data object 184. When a file 133 or folder 136 is copied, a duplicate file 133 or folder 136 (and contents) may be created to point to the same data object(s) 184. The data object 184 itself may be duplicated when necessary according to copy-on-write or another methodology.

When a file 133 or folder 136 is moved, the parent object reference 151 or 163 may be updated, without any changes to the underlying data object(s) 184. Similarly, when a change is made concerning where the underlying data objects 184 are stored, the file 133 or folder 136 may remain unchanged. When a file 133 or folder 136 is deleted, data object(s) 184 may be removed if no other files 133 point to the data object(s) 184. In some cases, uploading and downloading functionality may involve the client application 187 interfacing directly with the data storage service 181. The implementations of the operations described above limit modifications to the data objects 184 in the data store(s) 178, which may be expensive in terms of time or cost.

When the files 133 are created in the file system 130, when the files 133 are accessed, and/or at another time, file variants 137 may be created for various files 133. The file variants 137 correspond to variants of the files 133 that may be data reduced and/or customized for delivery to certain types of clients 109 or applications 124. In some cases, the file variants 137 may be said to be derivatives of the files 133, at least in part. In other cases, the file variants 137 may merely be related to the files 133. Further, some file variants 137 may be applicable to all clients 109 and applications 124.

In some cases, the variant service 121 may be responsible for maintaining the file variants 137 for the files 133. Where the file variants 137 are customized for a particular characteristic of a client 109 or application 124, they may be data reduced to facilitate mobile streaming, they may be downsampled or resized for display on a client 109, they may be pre-processed for an application platform associated with the client 109, or otherwise encoded. Various variant encoders 122 may be employed to perform the encoding.

As a non-limiting example, a user may have a library of audio files 133 in a file system 130. Such audio files 133 may initially be placed in the file system 130 in a high-bitrate format, such as Moving Pictures Experts Group (MPEG) Layer 3 (MP3) at a 256 kilobits per second bitrate. Such a format may be considered lossless or near lossless. However, the user may wish to listen to the audio file 133 through a mobile computing device, with a connection to the network 112 that has relatively low bandwidth and may be susceptible to periods of connectivity loss.

Accordingly, the variant service 121 may generate a file variant 137 for the file 133 that corresponds to a version of the file 133 that is customized for delivery to the mobile computing device. For example, a bitrate of 64 kilobits per second may be considered optimal for the type of mobile computing device. The variant encoder 122 may correspond to an MP3 audio codec and may be configured to encode the high-bitrate audio file 133 into a low-bitrate file variant 137.

When the user accesses the audio file 133 from the mobile computing device, the appropriate file variant 137 may be automatically substituted. Such a substitution may be transparent or non-transparent. For example, a user may wish to download the original high-bitrate audio file 133 as a progressive download rather than merely a stream. The variant service 121 and/or the file service 118 may permit the user an option to download the original audio file 133. Such an option may be selected automatically according to the context of the request for the file 133.

As another non-limiting example, a user may wish to download a document on a tablet computing device. The document may have originally been created for display on a large widescreen display monitor. The variant service 121 may be configured to detect that the user is requesting the file 133 from the tablet computing device and to encode a file variant 137 appropriately. The file variant 137 may be a resized version of the document that is customized for the display of the tablet computing device.

As yet another non-limiting example, a user may upload multiple high-resolution image files 133 to the file system 130. The variant service 121 may create file variants 137 corresponding to lower resolution, reduced size thumbnail images of the image files 133 automatically, regardless of the types of clients 109 associated with the file system 130. The thumbnail images that are file variants 137 may be automatically detected by an application 124 that is a photo album and used to render album pages containing thumbnails, with the option to access the original high-resolution image files 133.

As yet another non-limiting example, a user may upload a music file 133 to the file system 130. Using external data, the variant service 121 may identify the music file 133 and create a file variant 137 that corresponds to album cover art that is related to the music file 133. One or more images corresponding to the album cover art may be stored in a data store 178 or 179 and linked to one or more file variants 137 of the music file 133. In one example, an initial file variant 137 may be a high resolution version of the cover art, while a variant of the file variant 137 may be a thumbnail version of the cover art.

In some embodiments, the data underlying the file variants 137 may be stored in a reduced durability data store 179, which has a higher likelihood of the data being lost or inaccessible. The reduced durability may not be a problem for the file variants 137 because they may be capable of regeneration from data objects 184 that are stored in a data store 178 having a higher level of durability. Reduced durability data storage may have a lower cost and/or other advantages over high durability data storage.

Further, the variant service 121 may be configured to periodically delete file variants 137 or their underlying data when they have not been used within a predetermined length of time or are not predicted to be used. For example, several file variants 137 may be generated for a tablet computing device, but the user may have sold the tablet computing device and will never access the file variants 137 again. Thus, the applicable file variants 137 may be safely deleted. Even if the user were to access the files 133 from another tablet computing device, new file variants 137 may be regenerated from the original files 133 on demand or when otherwise appropriate.

The variant service 121 may be configured to identify file variants 137 that are customized for capabilities of a client 109 or application 124 according to the client information 138. Upon knowing what type of client 109 or application 124 is requesting a file 133, the variant service 121 may refer to the capabilities of the client 109 or application 124 in the client information 138. The variant service 121 may determine whether the capabilities match the characteristics of one or more file variants 137 associated with a requested file 133. In one embodiment, the file variant 137 that is the best match may be returned. In another embodiment, all of the file variants 137 for the file 133 that are compatible may be returned.

In some embodiments, the variant service 121 may be exposed to a user at a client 109 to allow the user to obtain a listing of file variants 137 for a particular file 133 and request a file variant 137 from the listing. Such file variants 137 may or may not exist. If the requested file variant 137 does not exist, it may be generated on demand by the variant service 121. In one example, the user may provide a description of the client 109 to the variant service 121, which may then determine the file variants 137 that pertain to the particular client 109.

Figure 2:
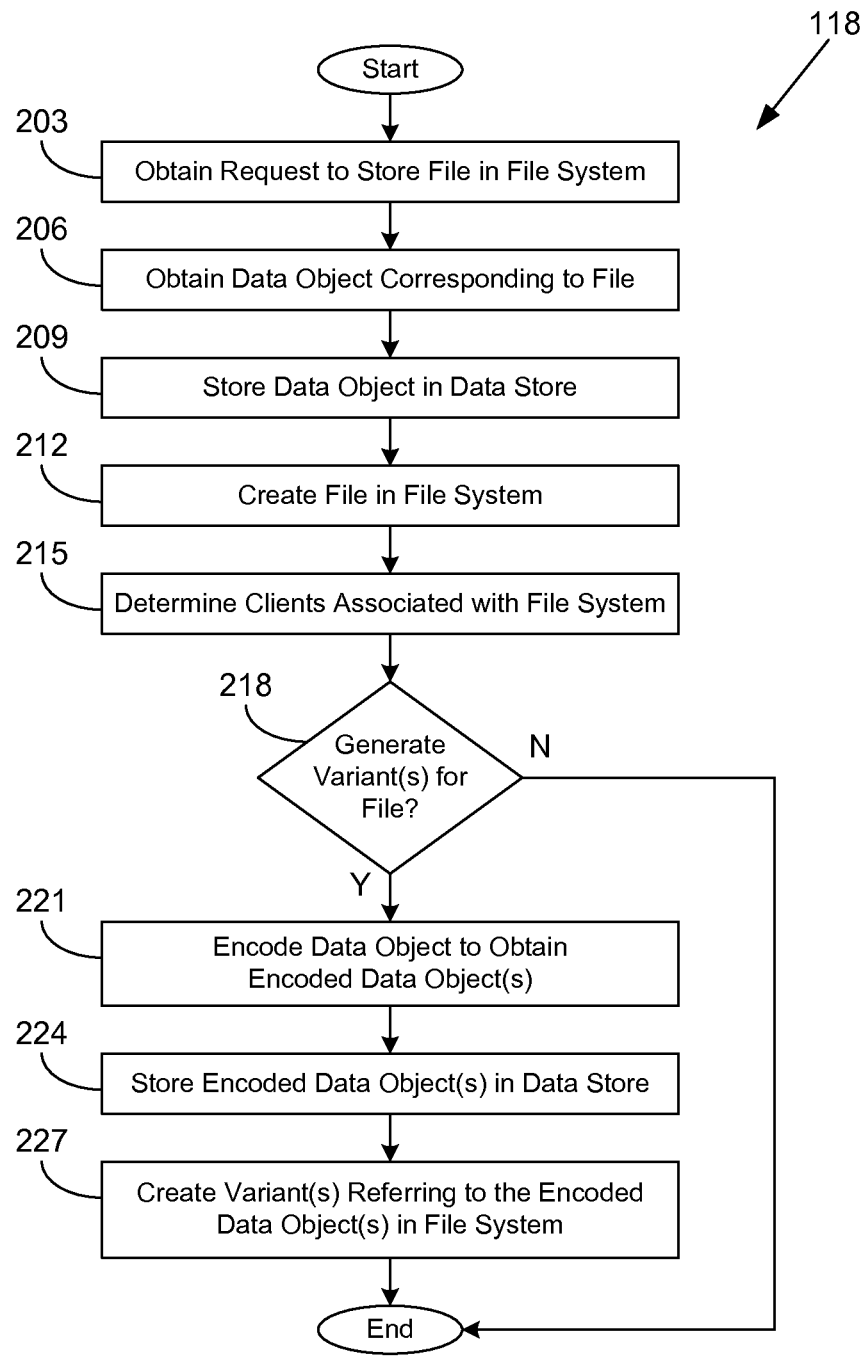
FIGS. 2-4 are flowcharts illustrating examples of functionality implemented as portions of file service executed in a computing device in the networked environment of FIG. 1 according to various embodiments of the present disclosure.

Referring next to FIG. 2, shown is a flowchart that provides one example of the operation of a portion of the file service 118 according to various embodiments. In particular, FIG. 2 relates to storing a file 133 (FIG. 1) in a file system 130 (FIG. 1) and creating file variants 137 (FIG. 1) if desired. It is understood that the flowchart of FIG. 2 provides merely an example of the many different types of functional arrangements that may be employed to implement the operation of the portion of the file service 118 as described herein. As an alternative, the flowchart of FIG. 2 may be viewed as depicting an example of steps of a method implemented in the computing device 103 (FIG. 1) according to one or more embodiments. Although the tasks of FIG. 2 are described as being performed by the file service 118, one or more of the tasks of FIG. 2 may be performed by the variant service 121 (FIG. 1), the data storage service 181 (FIG. 1), and/or other applications in other embodiments.

Beginning with box 203, the file service 118 obtains a request to store a file 133 in a file system 130. Such a request may originate with a client application 187 (FIG. 1) or an application 124 (FIG. 1). In box 206, the file service 118 obtains a data object 184 (FIG. 1) that corresponds to the file 133 from the client application 187 or the application 124. In box 209, the file service 118 stores the data object 184 in the data store 178 (FIG. 1).

In box 212, the file service 118 creates the file 133 in the file system 130. To this end, the file service 118 may set a file name 142 (FIG. 1) according to the request, generate a unique identifier 145 (FIG. 1) for the file 133, set a reference to the data object 184 stored in the data store 178 as a data object reference 148 (FIG. 1), set a unique identifier 160 (FIG. 1) of a parent folder 136 (FIG. 1) as a parent object reference 163 (FIG. 1), and set permissions and/or other metadata for the file 133.

In box 215, the file service 118 determines clients 109 that are associated with the file system 130 and/or the file 133. As a non-limiting example, a user associated with the file system 130 may have used previously, or explicitly configured, clients 109 such as an electronic book reader, a laptop computer, and a smartphone. Further, the user may have used certain client applications 187, such as browser applications, music players, document processing applications, etc. that may impact what versions of files 133 are used.

In box 218, the file service 118 determines whether one or more file variants 137 are to be generated for the file 133. In some cases, such a determination may depend on the clients 109 associated with the file system 130 and/or the file 133. In other cases, such a determination may be independent of the clients 109. If no file variant 137 is to be generated for the file 133, the portion of the file service 118 ends. Otherwise, the file service 118 proceeds to box 221.

In box 221, the file service 118 encodes the data object 184 using one or more appropriate variant encoders 122 (FIG. 1) to obtain one or more encoded data objects. The encoded data objects are stored in a data store in box 224. In one embodiment, the encoded data objects are stored as data objects 185 (FIG. 1) in the reduced durability data store 179 (FIG. 1). In another embodiment, the encoded data objects are stored as data objects 184 in the data store 178.

In box 227, the file service 118 creates one or more file variants 137 referring to the encoded data object(s) in the file system 130. To this end, the file service 118 may generate respective file name(s) 164 (FIG. 1) and unique identifiers 165 (FIG. 1) for the file variants 137. The file service 118 may set the data object reference 166 (FIG. 1) for the file variants 137 to point to an identifier of the respective encoded data object stored in the data store 178 or the reduced durability data store 179. The file service 118 may set the parent object reference 167 (FIG. 1) for each of the file variants 137 to be the unique identifier 145 of the file 133. Thereafter, the portion of the file service 118 ends.

Figure 3:
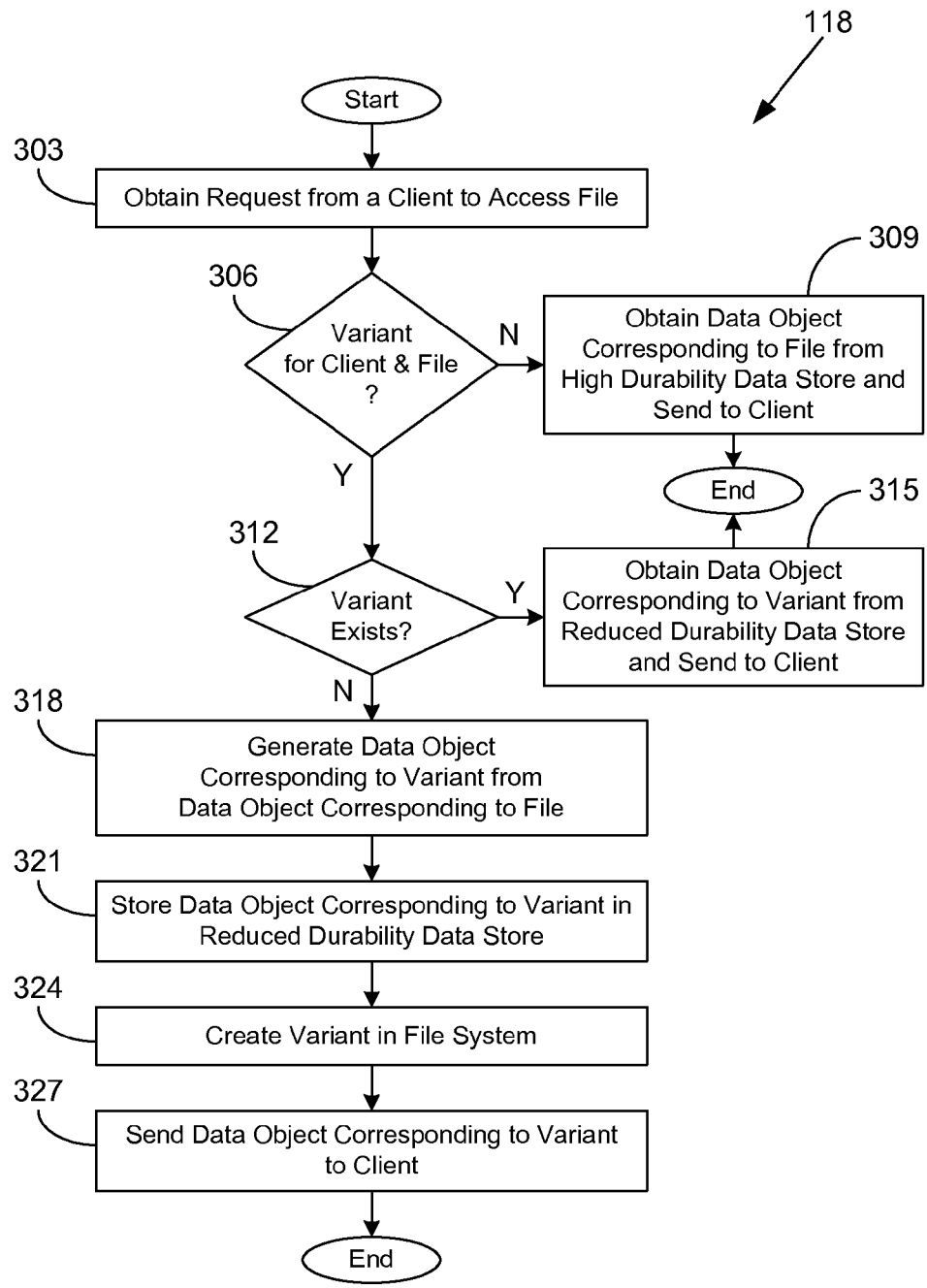

Moving on to FIG. 3, shown is a flowchart that provides one example of the operation of another portion of the file service 118 according to various embodiments. In particular, FIG. 3 relates to accessing a file 133 (FIG. 1) in a file system 130 (FIG. 1). It is understood that the flowchart of FIG. 3 provides merely an example of the many different types of functional arrangements that may be employed to implement the operation of the portion of the file service 118 as described herein. As an alternative, the flowchart of FIG. 3 may be viewed as depicting an example of steps of a method implemented in the computing device 103 (FIG. 1) according to one or more embodiments. Although the tasks of FIG. 3 are described as being performed by the file service 118, one or more of the tasks of FIG. 3 may be performed by the variant service 121 (FIG. 1), the data storage service 181 (FIG. 1), and/or other applications in other embodiments.

Beginning with box 303, the file service 118 obtains a request from a client 109 (FIG. 1) to access a file 133. The request may be obtained directly from a client application 187 (FIG. 1) or through an application 124 (FIG. 1). In box 306, the file service 118 determines whether a file variant 137 (FIG. 1) should be provided instead of the file 133 according to the type of client 109 and/or the type of file 133. If no file variant 137 is to be provided, the file service 118 continues to box 309 and obtains a data object 184 (FIG. 1) corresponding to the requested file 133 from the data store 178 (FIG. 1) and sends the data object 184 to the client 109. It is noted that the data store 178 may correspond to a high durability data store 178 in some embodiments. Thereafter, the portion of the file service 118 ends.

Otherwise, if a file variant 137 is to be provided, the file service 118 moves from box 306 to box 312. In box 312, the file service 118 determines whether the file variant 137 exists in the file system 130. More specifically, the file service 118 may determine whether a corresponding encoded data object 185 (FIG. 1) exists in some embodiments. If the appropriate file variant 137 for the client 109 exists, the file service 118 obtains the data object 185 (FIG. 1) from the reduced durability data store 179 (FIG. 1) and sends the data object 185 to the client 109. In some embodiments, the file variant 137 may instead point to a data object 184 stored in the data store 178. In such cases, the corresponding data object 184 is obtained and sent to the client 109. Thereafter, the portion of the file service 118 ends.

Otherwise, if the file variant 137 does not exist, the file service 118 moves from box 312 to box 318. In box 318, the file service 118 generates an encoded data object corresponding to the file variant 137 from the data object 184 corresponding to the file 133. Various variant encoders 122 (FIG. 1) may be employed, and a variant service 121 may coordinate this task in some embodiments. In box 321, the file service 118 stores the encoded data object corresponding to the file variant 137 as a data object 185 in the reduced durability data store 179. In other embodiments, the file service 118 may instead store the encoded data object corresponding to the file variant 137 as a data object 184 in the data store 178.

In box 324, the file service 118 creates the file variant 137 in the file system 130. To this end, the file service 118 may generate respective file name(s) 164 (FIG. 1) and unique identifiers 165 (FIG. 1) for the file variants 137. The file service 118 may set the data object reference 166 (FIG. 1) for the file variants 137 to point to an identifier of the respective encoded data object stored in the data store 178 or the reduced durability data store 179. The file service 118 may set the parent object reference 167 (FIG. 1) for each of the file variants 137 to be the unique identifier 145 (FIG. 1) of the file 133. In box 327, the file service 118 sends the encoded data object that corresponds to the file variant 137 to the client 109. In one embodiment, the encoded data object may be sent to the client 109 while it is being generated and stored. Such an optimization may reduce the delay associated with encoding the data object and storing it before sending. Thereafter, the portion of the file service 118 ends.

Figure 4:
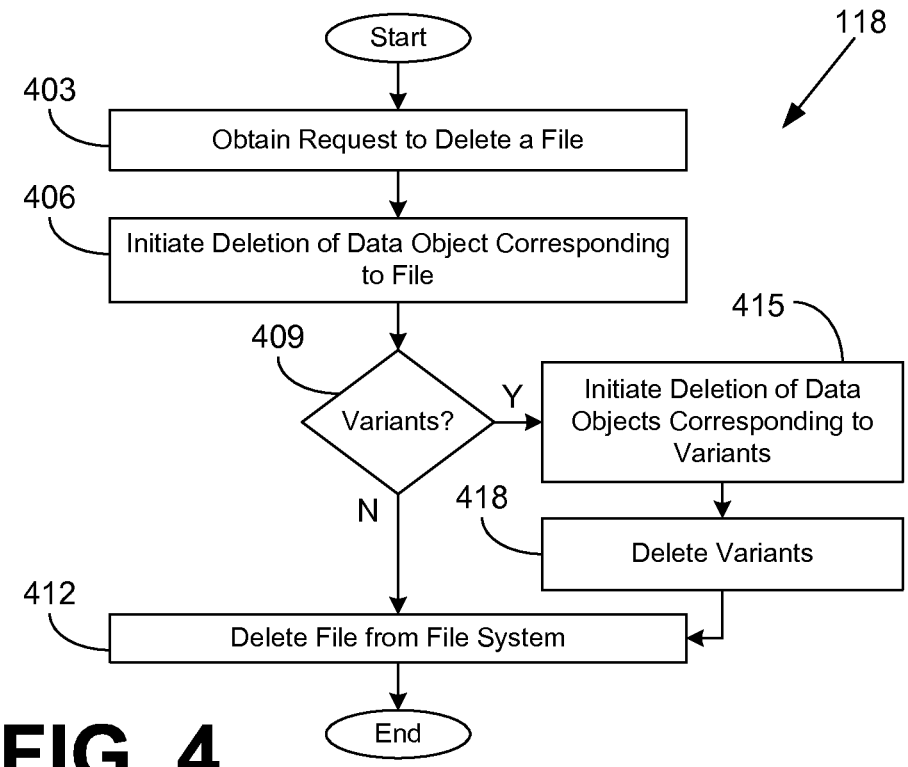

Turning now to FIG. 4, shown is a flowchart that provides one example of the operation of yet another portion of the file service 118 according to various embodiments. In particular, FIG. 4 relates to deleting a file 133 (FIG. 1) in a file system 130 (FIG. 1). It is understood that the flowchart of FIG. 4 provides merely an example of the many different types of functional arrangements that may be employed to implement the operation of the portion of the file service 118 as described herein. As an alternative, the flowchart of FIG. 4 may be viewed as depicting an example of steps of a method implemented in the computing device 103 (FIG. 1) according to one or more embodiments. Although the tasks of FIG. 4 are described as being performed by the file service 118, one or more of the tasks of FIG. 4 may be performed by the variant service 121 (FIG. 1), the data storage service 181 (FIG. 1), and/or other applications in other embodiments.

Beginning with box 403, the file service 118 obtains a request to delete a file 133 from a client 109. In particular, the request may be obtained from a client application 187 (FIG. 1) or from an application 124 (FIG. 1). In box 406, the file service 118 initiates deletion of the data object 184 (FIG. 1) that corresponds to the file 133 as identified by the data object reference 148 (FIG. 1). In one embodiment, a delay or wait time may be employed to avoid a race condition when deleting the data object 184.

In box 409, the file service 118 determines whether any file variants 137 (FIG. 1) are associated with the file 133. In other words, the file service 118 determines whether any file variants 137 have a parent object reference 167 (FIG. 1) set to be the unique identifier 145 (FIG. 1) of the file 133. If no file variants 137 are associated with the file 133, the file service 118 proceeds to box 412 and deletes the file 133 from the file system 130. Thereafter, the portion of the file service 118 ends. However, if file variants 137 are associated with the file 133, the file service 118 instead continues to box 415.

In box 415, the file service 118 initiates deletion of the data objects 185 (FIG. 1) and/or data objects 184 that correspond to the file variants 137. This may include variants of file variants 137. In one embodiment, a delay or wait time may be employed to avoid a race condition when deleting the data objects 184, 185. In box 418, the file service 118 deletes the file variants 137 (and any variants thereof) from the file system 130. In box 412, the file service 118 deletes the file 133 from the file system 130. Thereafter, the portion of the file service 118 ends.

Figure 5:
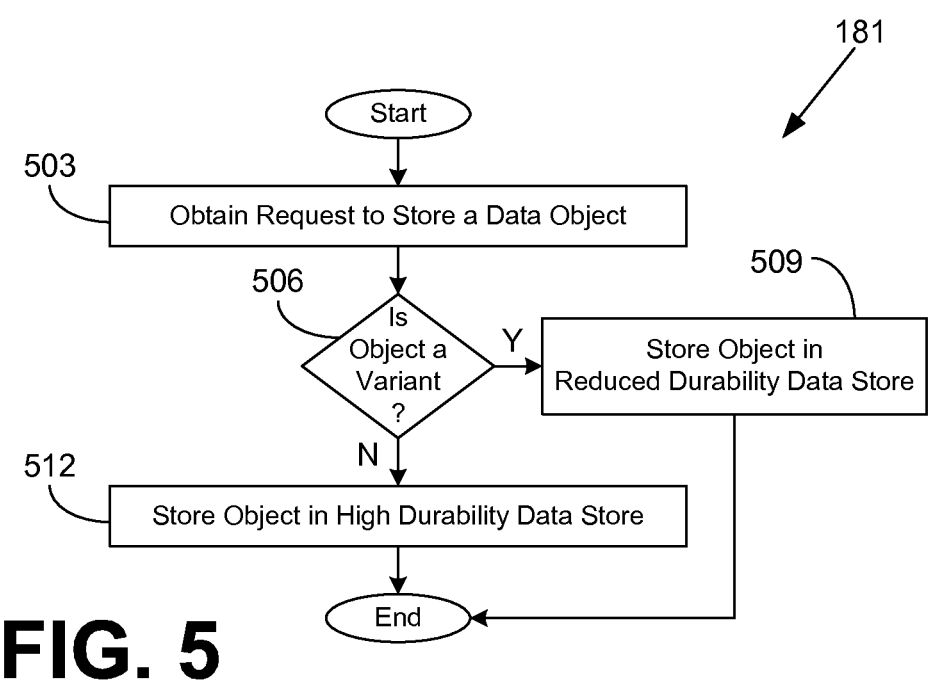
FIG. 5 is a flowchart illustrating one example of functionality implemented as portions of a data storage service executed in a computing device in the networked environment of FIG. 1 according to various embodiments of the present disclosure.

Referring next to FIG. 5, shown is a flowchart that provides one example of the operation of a portion of the data storage service 181 according to various embodiments. It is understood that the flowchart of FIG. 5 provides merely an example of the many different types of functional arrangements that may be employed to implement the operation of the portion of the data storage service 181 as described herein. As an alternative, the flowchart of FIG. 5 may be viewed as depicting an example of steps of a method implemented in the computing device 106 (FIG. 1) according to one or more embodiments. Although the tasks of FIG. 5 are described as being performed by the data storage service 181, one or more of the tasks of FIG. 5 may be performed by the variant service 121 (FIG. 1), the file service 118 (FIG. 1), and/or other applications in other embodiments.

Beginning with box 503, the data storage service 181 obtains a request to store a data object. Such a request may be obtained, for example, from the file service 118, the variant service 121, or another application. In box 506, the data storage service 181 determines whether the data object corresponds to a file variant 137 (FIG. 1). If the data object corresponds to a file variant 137, the data storage service 181 proceeds to box 509 and stores the data object as a data object 185 (FIG. 1) in the reduced durability data store 179 (FIG. 1). In one embodiment, the data storage service 181 may also return an identifier of the data object 185 to the requestor. Thereafter, the portion of the data storage service 181 ends.

Otherwise, if the data storage service 181 determines that the data object does not correspond to a file variant 137, the data storage service 181 continues to box 512. In box 512, the data storage service 181 stores the data object as a data object 184 (FIG. 1) in the data store 178 (FIG. 1), which is associated with a higher level of data durability than the reduced durability data store 179. In one embodiment, the data storage service 181 may also return an identifier of the data object 184 to the requestor. Thereafter, the portion of the data storage service 181 ends.

Figure 6:
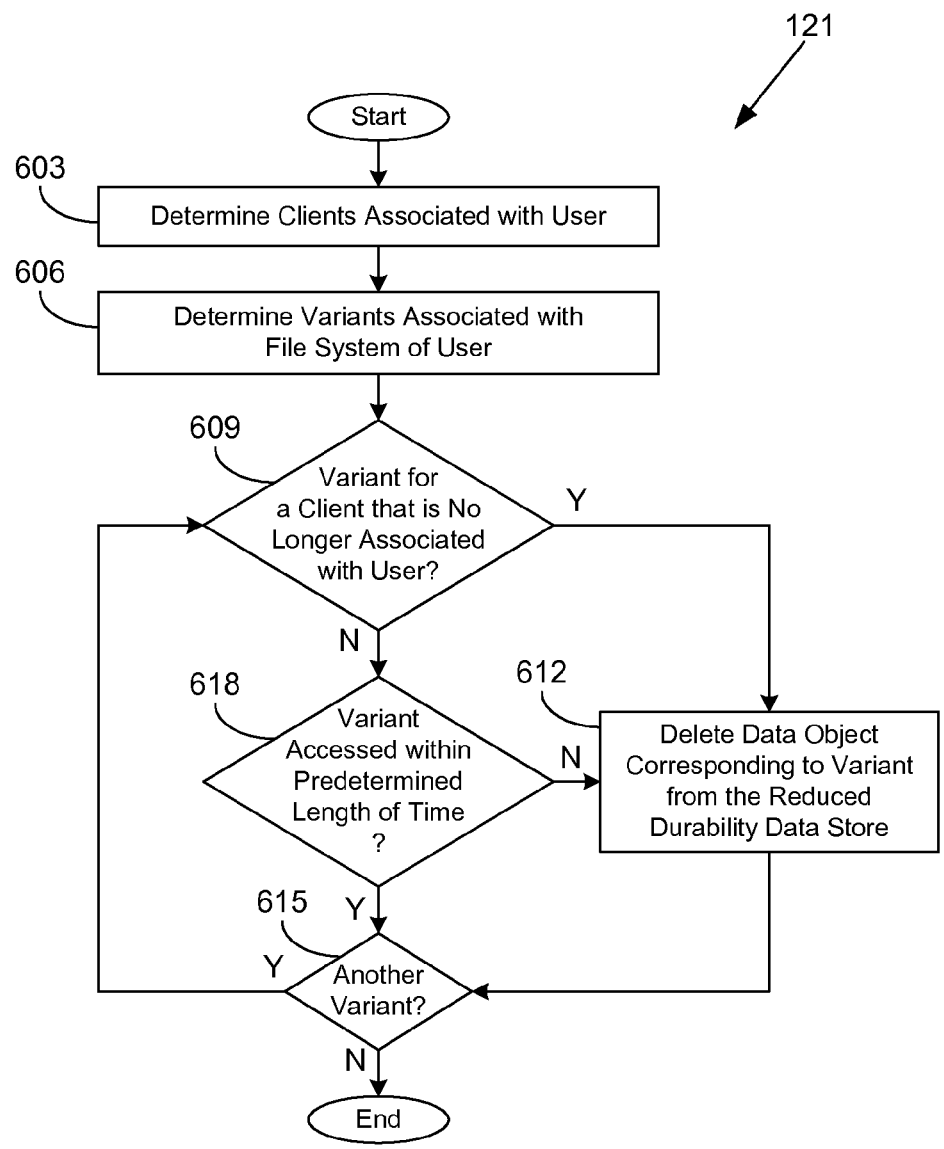
FIG. 6 is a flowchart illustrating one example of functionality implemented as portions of a variant service executed in a computing device in the networked environment of FIG. 1 according to various embodiments of the present disclosure.

Continuing on to FIG. 6, shown is a flowchart that provides one example of the operation of a portion of the variant service 121 according to various embodiments. It is understood that the flowchart of FIG. 6 provides merely an example of the many different types of functional arrangements that may be employed to implement the operation of the portion of the variant service 121 as described herein. As an alternative, the flowchart of FIG. 6 may be viewed as depicting an example of steps of a method implemented in the computing device 103 (FIG. 1) according to one or more embodiments. Although the tasks of FIG. 6 are described as being performed by the data storage service 181, one or more of the tasks of FIG. 6 may be performed by the file service 118 (FIG. 1), and/or other applications in other embodiments.

Beginning with box 603, the variant service 121 determines clients 109 (FIG. 1) that are associated with the file system 130 (FIG. 1) of a user. Although clients 109 are referenced in connection with FIG. 6, it is understood that the principles of FIG. 6 may be applied to applications 124 (FIG. 1) with defined capabilities and preferences as well. As a non-limiting example, a user associated with the file system 130 may have used previously, or explicitly configured, clients 109 such as an electronic book reader, a laptop computer, and a smartphone. Further, the user may have used certain client applications 187 (FIG. 1), such as browser applications, music players, document processing applications, etc. that may impact what versions of files 133 (FIG. 1) are used. In box 606, the variant service 121 determines the file variants 137 (FIG. 1) that are associated with the file system 130 of the user.

In box 609, for one of the file variants 137, the variant service 121 determines whether the file variant 137 is associated with a client 109 that is no longer associated with the user. If the file variant 137 is associated with a client 109 that is no longer associated with the user (or the file system 130), the variant service 121 moves to box 612 and deletes the data object 185 (FIG. 1) corresponding to the file variant 137 from the reduced durability data store 179 (FIG. 1). The file variant 137 may subsequently be deleted from the file system 130. In various embodiments, some time may elapse between when a client 109 is disassociated and when the deletion is initiated. Also, the variant service 121 may determine that the file variant 137 may be usable for another client 109, in which case the variant service 121 may decide not to delete the file variant 137. The variant service 121 continues to box 615.

If the variant service 121 determines, in box 609, that the file variant 137 is not for a client 109 that is no longer associated with the user, the variant service 121 proceeds to box 618. In box 618, the variant service 121 determines whether the file variant 137 has been accessed within a predetermined length of time or otherwise meets retention criteria. If the variant service 121 does not meet retention criteria, the variant service 121 continues to box 612 and deletes the data object 185 corresponding to the file variant 137 from the reduced durability data store 179. The file variant 137 may subsequently be deleted from the file system 130. The variant service 121 continues to box 615.

In box 615, the variant service 121 determines whether another file variant 137 remains to be processed. If so, the variant service 121 returns to box 609 and begins evaluating the other file variant 137. If no other file variant 137 remains to be processed, the portion of the variant service 121 ends.

Figure 7:
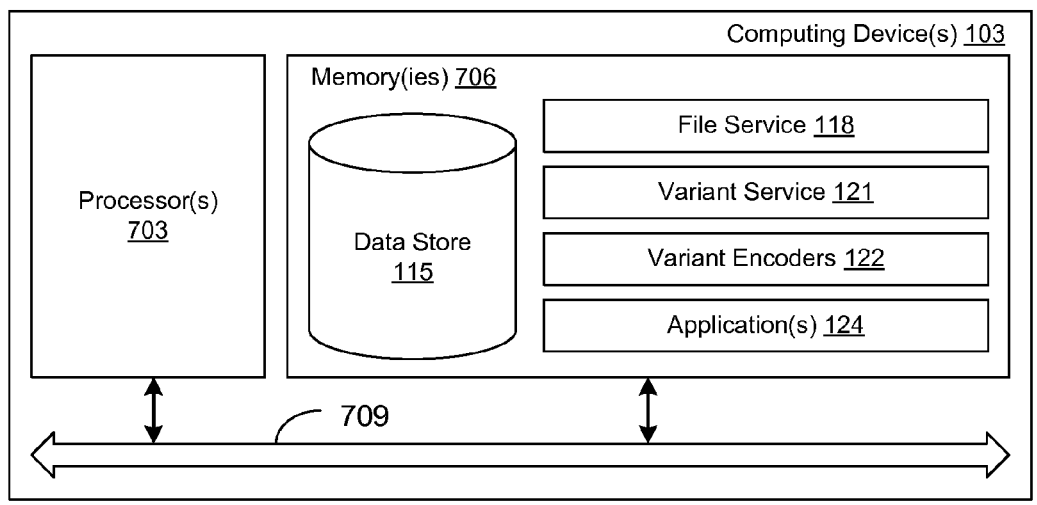
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated. Although the computing device 103 is depicted in FIG. 7, it is understood that the computing device 106 may be of similar construction.

Stored in the memory 706 are both data and several components that are executable by the processor 703. In particular, stored in the memory 706 and executable by the processor 703 are the file service 118, the variant service 121, the variant encoders 122, the applications 124, and potentially other applications. Also stored in the memory 706 may be a data store 115 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 112 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the file service 118, the variant service 121, the variant encoders 122, the applications 124, the data storage service 181 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-6 show the functionality and operation of an implementation of portions of the file service 118, the variant service 121, and the data storage service 181. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 2-6 show a specific order of execution, it is understood that the order of execution may differ from that which is depicted. For example, the order of execution of two or more blocks may be scrambled relative to the order shown. Also, two or more blocks shown in succession in FIGS. 2-6 may be executed concurrently or with partial concurrence. Further, in some embodiments, one or more of the blocks shown in FIGS. 2-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the file service 118, the variant service 121, the variant encoders 122, the applications 124, and the data storage service 181, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, the at least one program having instructions that perform a method comprising:
   maintaining, by the at least one computing device, a plurality of file systems for a plurality of users, each of the file systems including a plurality of files and at least one folder, each of the files including a respective unique identifier and a respective reference to a primary data object stored in a first data store;
   generating, by the at least one computing device, a variant of one of the files, the variant including the unique identifier of the one of files and a reference to a secondary data object that is derived from the primary data object referenced by the one of the files, the variant being customized for a client associated with the corresponding one of the users that is associated with the one of the files, the secondary data object being stored in a reduced durability data store;
   obtaining, by the at least one computing device, a request for the one of the files from the client;
   sending, by the at least one computing device, the secondary data object to the client in response to the request instead of the primary data object when the secondary data object is available;
   regenerating, by the at least one computing device, the secondary data object from the primary data object when the secondary data object is unavailable and sending the secondary data object to the client in response to the request instead of the primary data object; and
   wherein the reduced durability data store is associated with a lower level of data durability than the first data store.

2. The non-transitory computer-readable medium of claim 1, wherein the variant corresponds to one of a plurality of variants of the one of the files, and each one of the variants is customized for a respective one of a plurality of clients associated with the corresponding one of the users that is associated with the one of the files.

3. The non-transitory computer-readable medium of claim 1, wherein the method further comprises:
   obtaining, by the at least one computing device, another request for the one of the files from another client; and
   sending, by the at least one computing device, the primary data object to the other client in response to the request.

4. A system, comprising:
   a first data store that is associated with a first level of data durability;
   a reduced-durability data store that is associated with a second level of data durability that is lower than the first level of data durability; and
   at least one computing device configured to perform a method comprising:
      obtaining a request to store a data object;
      determining if the data object is a derivative of another data object stored in the first data store;

storing the data object in the reduced-durability data store when the data object is the derivative of the another data object stored in the first data store; and storing the data object in the first data store when the data object is not the derivative of the another data object stored in the first data store.

5. The system of claim 4, method further comprises:

obtaining a customer request to store the data object in the reduced-durability data store; and storing the data object in the reduced-durability data store instead of the first data store in response to the customer request.

6. The system of claim 4, wherein the method further comprises:

determining whether the data object stored in the reduced-durability data store has been lost;

initiating a regeneration of the data object from the another data object stored in the first data store when the data object stored in the reduced-durability data store has been lost; and storing the data object that has been regenerated in the reduced-durability data store.

7. The system of claim 4, wherein the method further comprises deleting the data object from the reduced-durability data store when the data object has not been accessed within a predetermined length of time.

8. The system of claim 7, wherein the method further comprises initiating a regeneration of the data object from the another data object stored in the first data store after the data object has been deleted from the reduced-durability data store.

9. The system of claim 4, wherein the method further comprises:

obtaining a request for the data object, wherein the data object is the derivative of the another data object;

determining whether the data object is available from the reduced-durability data store;

producing the data object from the reduced-durability data store in response to the request when the data object is available from the reduced-durability data store; and producing the data object in response to the request by regenerating the data object from the another data object when the data object is not available from the reduced-durability data store.

10. The system of claim 4, wherein the data object stored in the reduced-durability data store is a data-reduced version of the another data object.

11. The system of claim 4, wherein the data object stored in the reduced-durability data store is a version of the another data object that is customized for a type of client that is associated with a file system.

12. The system of claim 4, wherein the method further comprises generating the data object from the another data object.

13. The system of claim 4, wherein the reduced-durability data store is configured to store fewer redundant copies of data than the first data store.

14. The system of claim 4, wherein the reduced-durability data store is associated with a lower level of hardware redundancy than the first data store.

15. The system of claim 4, wherein the first data store includes data that can be processed to regenerate other data stored in the first data store, and the reduced-durability data store excludes data that can be processed to regenerate other data stored in the reduced-durability data store.

16. A method, comprising:

obtaining, by at least one computing device, a request to store a data object from a user;

generating, by the at least one computing device, a variant of the data object that is customized for delivery to a client associated with the user, the variant being generated from the data object;

communicating, by the at least one computing device, responsive to a request for the data object, the variant of the data object instead of the data object to the client;

deleting, by the at least one computing device, the variant of the data object; and regenerating, by the at least one computing device, the variant of the data object from the data object.

17. The method of claim 16, wherein the deleting is performed in response to determining, by the at least one computing device, that the client is no longer associated with the user.

18. The method of claim 16, wherein the deleting is performed in response to determining, by the at least one computing device, that the variant has not been accessed within a predetermined length of time.

19. The method of claim 16, wherein the client corresponds to a mobile computing device, and the variant is a version of the data object that is customized for streaming to the mobile computing device.

20. The method of claim 16, wherein the variant comprises a data-reduced version of the data object.

21. The method of claim 16, further comprising:

storing, by the at least one computing device, the data object in a first data store;

storing, by the at least one computing device, the variant in a reduced durability data store; and wherein the reduced durability data store is associated with a lower level of data durability than the first data store.

* * * * *